(12) United States Patent
Jin et al.

(10) Patent No.: US 8,233,008 B2
(45) Date of Patent: Jul. 31, 2012

(54) METHOD AND SYSTEM FOR DISTINCTIVELY DISPLAYING SELECTED FLOOR WITH SUFFICIENT DETAILS IN A THREE-DIMENSIONAL BUILDING MODEL

(75) Inventors: Janet JZX Jin, Shanghai (CN); Zhang ZYJ Yajun, Shanghai (CN); Thomas A. Plocher, Hugo, MN (US); Rui Zhang, Beijing (CN); Enyi Chen, Beijing (CN)

(73) Assignee: Honeywell International Inc., Morristown, NJ (US)

( * ) Notice: Subject to any disclaimer, the term of this patent is extended or adjusted under 35 U.S.C. 154(b) by 1356 days.

(21) Appl. No.: 11/656,171

(22) Filed: Jan. 19, 2007

(65) Prior Publication Data
US 2008/0177510 A1   Jul. 24, 2008

(51) Int. Cl.
*G09G 5/00* (2006.01)
(52) U.S. Cl. ......... 345/619; 345/649; 345/650; 345/653
(58) Field of Classification Search .................. 715/964, 715/854; 345/419, 619, 649, 650, 653
See application file for complete search history.

(56) References Cited

U.S. PATENT DOCUMENTS

| | | | |
|---|---|---|---|
| 5,838,326 A * | 11/1998 | Card et al. ..................... | 715/775 |
| 6,426,745 B1 | 7/2002 | Isaacs et al. ................... | 345/419 |
| 2004/0257375 A1* | 12/2004 | Cowperthwaite ............ | 345/582 |
| 2005/0252984 A1 | 11/2005 | Ahmed | |

FOREIGN PATENT DOCUMENTS
EP   1443431 A1   8/2004

OTHER PUBLICATIONS

Chittaro, Luca, Vijay K. Gatla, and Subramanian Venkataraman. "The Interactive 3D BreakAway Map: A Navigation and Examination Aid for Multi-floor 3D Worlds." Proceedings of the 2005 International Conference on Cyberworlds (2005): 59-66.*
Sarkar, Manojit, Scott S. Snibbe, Oren J. Tversky, and Steven P. Reiss. "Stretching the Rubber Sheet: A Metaphor for Viewing Large Layouts on Small Screens." Proceedings of the 6th Annual ACM Symposium on User Interface Software and Technology (1993.): 81-88.*
Houston, Mike, Chris Niederauer, Maneesh Agrawala, and Greg Humphreys. "Visualizing Dynamic Architectural Environments." Communications of the ACM 47.8 (2004): 55-59.*

(Continued)

*Primary Examiner* — Xiao M. Wu
*Assistant Examiner* — Scott E Sonners
(74) *Attorney, Agent, or Firm* — Kermit D. Lopez; Luis M. Ortiz; Kevin Soules

(57) ABSTRACT

A method, system and program product for distinctively displaying selected floors with sufficient details in a three-dimensional building model includes graphical metaphors that permit a selected or highlighted floor and their respective elements to be absolutely clear and distinct from the floors immediately above and below. The graphically displayed metaphors comprise "drawers", "wireframe", "expansion/compression", "projected floor", "sliding unselected floors", "turning the pages", "big map-small map", and "fisheye" graphical configurations. Such graphically displayed metaphors can be utilized to highlight a selected floor, separate it from adjacent floors, and provide a graphical effect of depicting the floor's vertical position within a building.

17 Claims, 16 Drawing Sheets

OTHER PUBLICATIONS

F. Steinicke, T. Ropinski, K. Hinrichs, G. Bruder; A Mulitple View System for Modeling Building Entities; Coordinated and Multiple Views in Exploratory Visualization, 2006. Proceedings. International Conference, London, England, Jul. 2006

S. Guven, S. Feiner; Authoring 3-D Hypermedia for Wearable Augmented and Virtual Reality; Seventh IEEE International Symposium, Oct. 2003.

T. Panas, R. Berrigan, J. Grundy; A 3D Metaphor for Software Production Visualization; IEEE Symposium Jul. 2003.

PCT—Notification of Transmittal of the International Search Report and the Written Opinion of the International Searching Authority, or the Declaration, Date of Mailing Jun. 23, 2008.

* cited by examiner

US 8,233,008 B2

METHOD AND SYSTEM FOR DISTINCTIVELY DISPLAYING SELECTED FLOOR WITH SUFFICIENT DETAILS IN A THREE-DIMENSIONAL BUILDING MODEL

TECHNICAL FIELD

Embodiments are generally related to data-processing methods and systems. Embodiments are additionally related to the computer-aided design of buildings. Embodiments are also related to three-dimensional building models, and techniques for distinctively displaying selected building floors with sufficient details in three-dimensional building models.

BACKGROUND OF THE INVENTION

Three-dimensional models of large buildings are used in graphical displays to support situation awareness in a variety of situations, such as, for example, firefighting, building security, and HVAC (Heating, Ventilating and Air conditioning) management. In a firefighting scenario, for example, a semi-transparent three-dimensional model of a building would be helpful for providing a "birds-eye" perspective view of a building, along with a view from the outside looking in, and with respect to locations of activated smoke and heat detectors in three-dimensional space. From such a display, a firefighter can comprehend the spread of a fire at a glance, particularly the vertical spread between floors or levels of the building. Such a service can provide the firefighter with a very intuitive technique for visualizing a path toward the fire and for viewing the locations of team members.

Users of three-dimensional graphical models of buildings, however, sometimes suffer from disorientation as they view and manipulate three-dimensional building graphics. Without any special aids, all floors of the building tend to look similar. Often floors with special events such as fires, security camera activations, etc. need to be highlighted by shading or other graphical technique so that it is easy for the user to view another part of the building, yet not lose their orientation to the problem floor.

Conversely, a user may desire to "select" a particular floor in the three-dimensional graphics and thereby view the floor in greater detail in contrast to the rest of the building. Common highlighting methods such as shading the flat plane of the selected floor or placing a wireframe around the selected floor can be problematic, particularly if textures are used to render the walls of the building. For example, the floor of a selected floor/level of the building can also be the ceiling of the floor immediately below. Also, it is difficult to present interior details of a particular floor/level such as walls and key objects with the selected floor highlighted, but not clearly separated from the floor above and below it.

In an effort to address the foregoing difficulties, graphical metaphors can be implemented in order to make the selected or highlighted floor and their elements (windows, ceilings, and objects like detectors, etc) absolutely clear and distinct from the floors immediately above and below. An example of such a solution is described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved computer-aided design of buildings.

It is another aspect of the present invention to provide for improved three-dimensional building models.

It is a further aspect of the present invention to provide for a method for distinctively displaying selected floor with sufficient details in three-dimensional building models.

The aforementioned aspects and other objectives and advantages can now be achieved as described herein. A method and system for distinctively displaying building features with sufficient details in a three-dimensional building model is disclosed. One or more graphical metaphors can be provided, which permit a user to select with an enhanced granularity one or more building features from among a plurality of building features associated with a three-dimensional model of a building. Thereafter, one or more building features can be graphically selected by the user utilizing one or more such graphical metaphors, in response to a particular user input, thereby allowing the user the ability to clearly identify, graphically manipulate and distinguish building features among the building features to thereby correctly visualize the selected building feature with respect to the three-dimensional model of the building.

The graphical metaphors can be used to make the selected or highlighted building features, such as building floors and their elements (e.g., windows, ceilings, and objects like detectors, etc) absolutely clear and distinct from the floors immediately above and below. The graphical metaphors can be composed of metaphors such as "drawers", "wireframe", "expansion/compression", "projected floors", "sliding unselected floors", "turning the pages", "big map-small map", "fisheye" and so forth. Such metaphors can be utilized to highlight a selected floor; separate it from adjacent floors, and then display the floor's vertical position in the three-dimensional building model.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
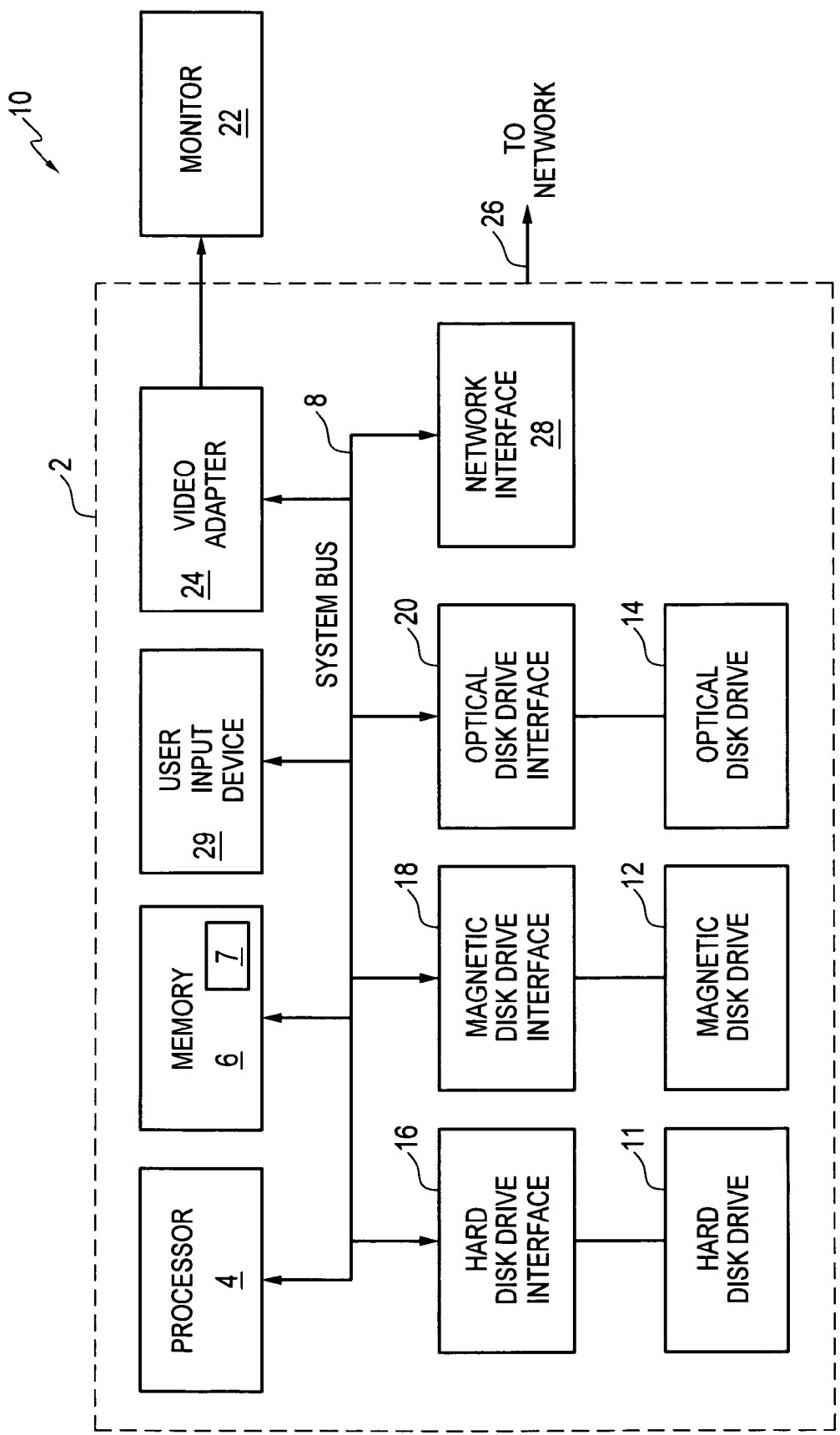
FIG. 1 illustrates a block diagram of a data-processing apparatus, which can be utilized to implement a preferred embodiment.

FIG. 1 illustrates a block diagram of a data-processing apparatus 10, which can be utilized to implement a preferred embodiment. Data-processing apparatus 10 can be used to implement a method for distinctively displaying selected building features (e.g., floors) with sufficient details in a three-dimensional building model as described in greater detail herein. Data-processing apparatus 10 can be configured to include a general purpose computing device, such as a computer 2. The computer 2 includes a processing unit 4, a memory 6, and a system bus 8 that operatively couples the various system components to the processing unit 4. One or more processing units 4 operate as either a single central processing unit (CPU) or a parallel processing environment. Data-processing apparatus 10 represents only one of many possible data-processing devices or systems for implementing embodiments. Data-processing apparatus 10 can be provided as a stand-alone personal computer, portable/laptop computer, PDA (personal digital assistant), server, mainframe computer, and so forth.

The data-processing apparatus 10 generally includes one or more data storage devices for storing and reading program and other data. Examples of such data storage devices include a hard disk drive 11 for reading from and writing to a hard disk (not shown), a magnetic disk drive 12 for reading from or writing to a removable magnetic disk (not shown), and an optical disc drive 14 for reading from or writing to a removable optical disc (not shown), such as a CD-ROM or other optical medium. A monitor 22 is connected to the system bus 8 through an adapter 24 or other interface. Additionally, the data-processing apparatus 10 can include other peripheral output devices (not shown), such as speakers and printers. For example, a user input device 29, such as a mouse, keyboard, and so forth, can be connected to system bus 8 in order to permit a user to enter data to and interact with data-processing apparatus 10.

The hard disk drive 11, magnetic disk drive 12, and optical disc drive 14 are connected to the system bus 8 by a hard disk drive interface 16, a magnetic disk drive interface 18, and an optical disc drive interface 20, respectively. These drives and their associated computer-readable media provide nonvolatile storage of computer-readable instructions, data structures, program modules, and other data for use by the data-processing apparatus 10. Note that such computer-readable instructions, data structures, program modules, and other data can be implemented as a module or group of modules, such as, for example, module 7, which can be stored within memory 6.

Note that the embodiments disclosed herein can be implemented in the context of a host operating system and one or more module(s) 7. In the computer programming arts, a software module can be typically implemented as a collection of routines and/or data structures that perform particular tasks or implement a particular abstract data type.

Software modules generally comprise instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

It is important to note that, although the embodiments are described in the context of a fully functional data-processing apparatus such as data-processing apparatus 10, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

Any type of computer-readable media that can store data that is accessible by a computer, such as magnetic cassettes, flash memory cards, digital versatile discs (DVDs), Bernoulli cartridges, random access memories (RAMs), and read only memories (ROMs) can be used in connection with the embodiments.

A number of program modules can be stored or encoded in a machine readable medium such as the hard disk drive 11, the, magnetic disk drive 12, the optical disc drive 14, ROM, RAM, etc or an electrical signal such as an electronic data stream received through a communications channel. These program modules can include an operating system, one or more application programs, other program modules, and program data.

The data-processing apparatus 10 can operate in a networked environment using logical connections to one or more remote computers (not shown). These logical connections are implemented using a communication device coupled to or integral with the data-processing apparatus 10. The data sequence to be analyzed can reside on a remote computer in the networked environment. The remote computer can be another computer, a server, a router, a network PC, a client, or a peer device or other common network node. FIG. 1 depicts the logical connection as a network connection 26 interfacing with the data-processing apparatus 10 through a network interface 28. Such networking environments are commonplace in office networks, enterprise-wide computer networks, intranets, and the Internet, which are all types of networks. It will be appreciated by those skilled in the art that the network connections shown are provided by way of example and that other means of and communications devices for establishing a communications link between the computers can be used.

Figure 2:
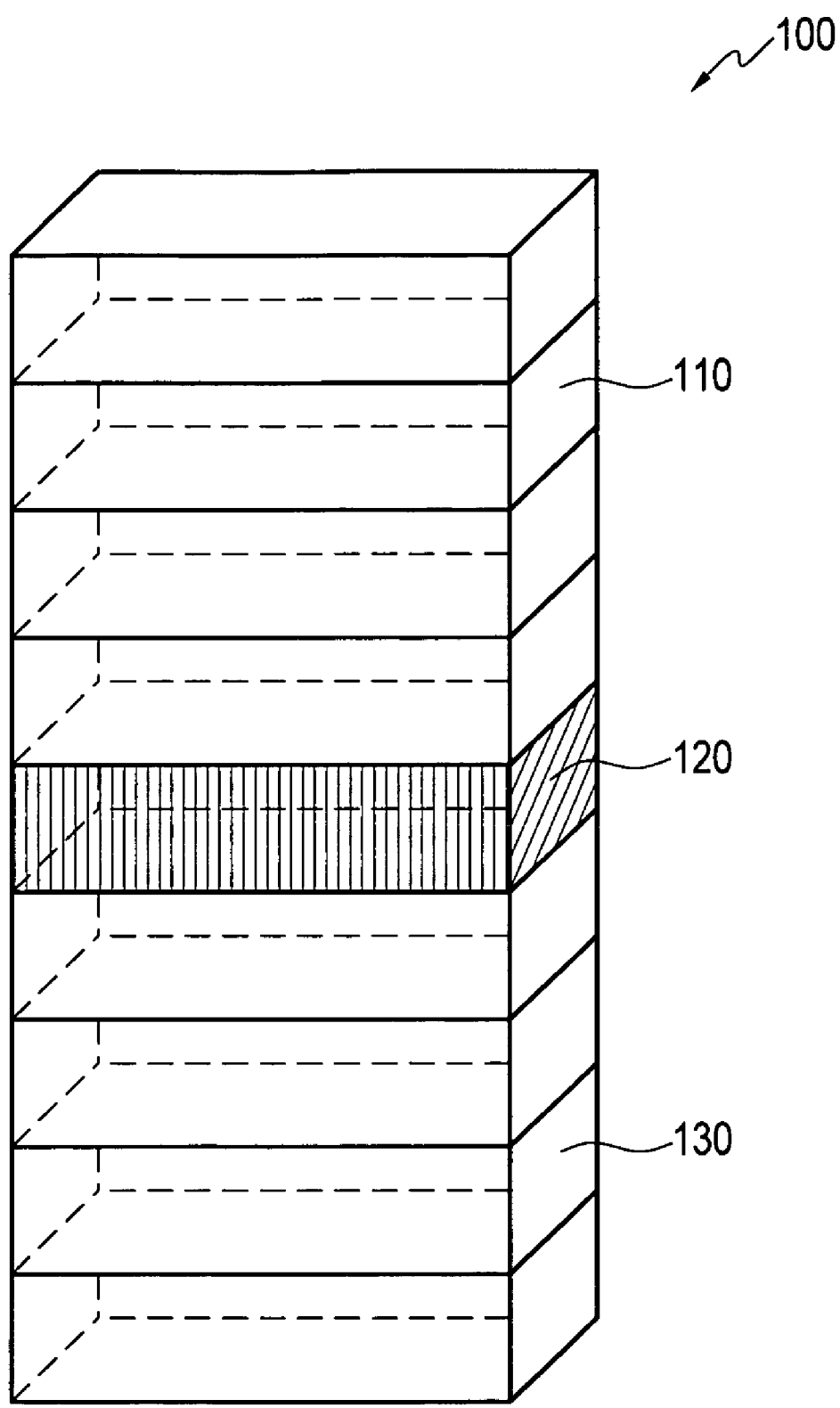
FIG. 2 illustrates a three-dimensional view of a graphically-displayed multi-floor building model highlighting a floor selected by a user, in accordance with a preferred embodiment.

Referring to FIG. 2 a three-dimensional view of a graphically-displayed multi-floor building model 100 highlighting a floor 120 selected by the user is illustrated, in accordance with a preferred embodiment. Note that the various graphically-displayed models and graphical metaphors described and illustrated herein with respect to FIGS. 2-10 can be provided for a user, graphically displayed for a user via display unit such as, for example, monitor 22 of FIG. 1, and manipulated by a user via a data-processing device, such as the data-processing apparatus 10 depicted in FIG. 1. Further, the graphical models, graphical metaphors, and three-dimensional views described herein can be implemented and processed via a software module, such as module 7 described earlier. FIGS. 2-10 generally illustrate a methodology or technique, which can be implemented using module 7 and/or an associated GUI (graphical user interface).

The multi-floor building model 100 can thus be displayed via a display screen of a monitor, such as, for example, monitor 22 of apparatus 10 depicted in FIG. 1. As indicated in FIG. 2, the selected or highlighted floor 120 is absolutely clear and distinct from the unselected floors 110 immediately above and below. Note that in FIGS. 1-10 illustrated and described herein, identical or similar parts or elements are generally indicated by identical reference numerals.

Figure 3A:
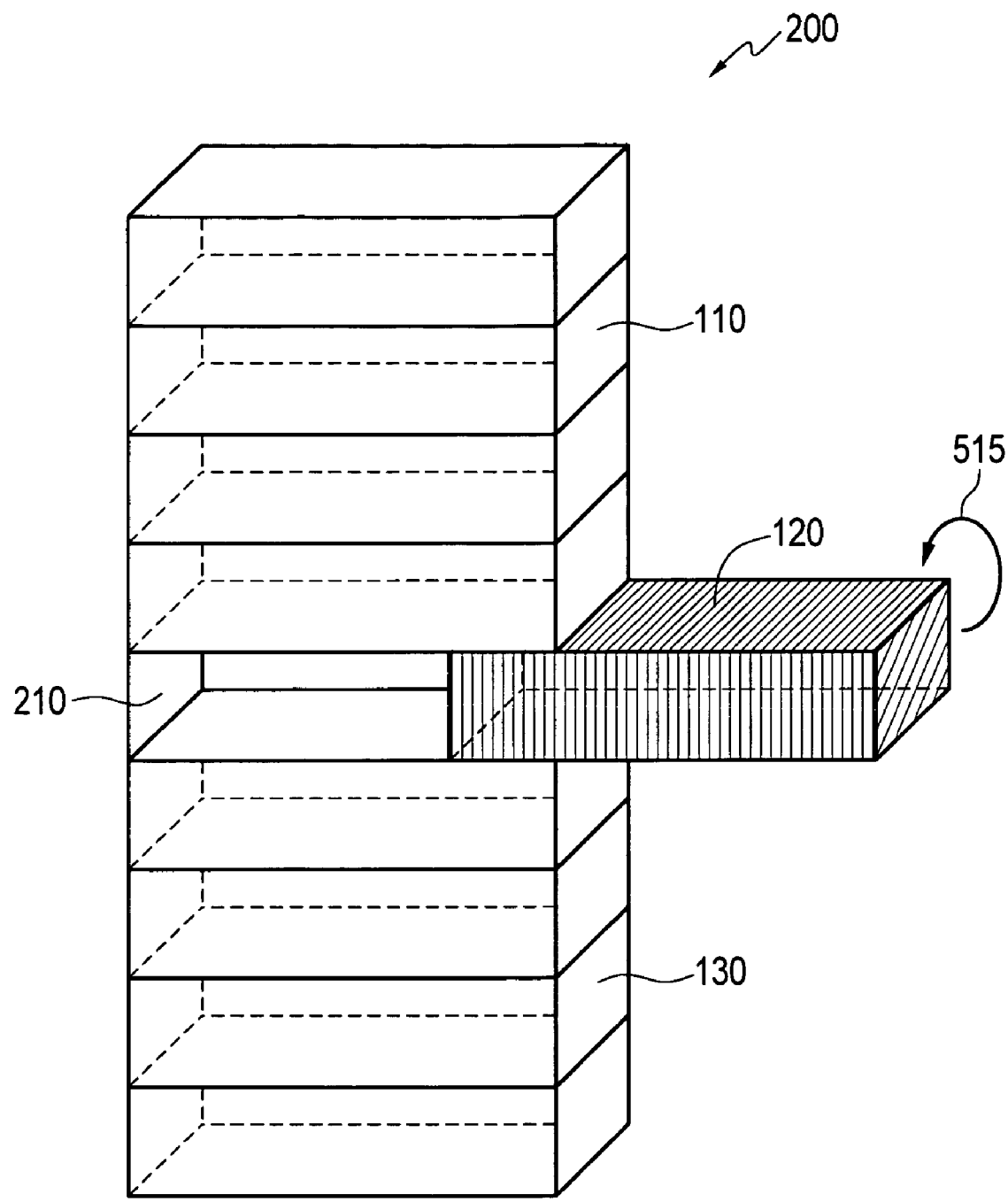
FIG. 3A illustrates a three-dimensional view of a multi-floor building model highlighting a graphical metaphor "drawers" with a highlighted floor pulled out of a graphically-displayed building, in accordance with an alternative embodiment.

Referring to FIG. 3A a three-dimensional view of the graphically-displayed multi-floor building model 100 depicted in FIG. 1 is illustrated highlighting a graphical metaphor of "Drawers" 200 with the highlighted floor 120 pulled out of the entire graphically-displayed building 130, in accordance with an alternative embodiment. The highlighted floor 120 can be simulated using software animation via one or more software modules, such as module 7 described earlier, and can be graphically "pulled out" from the whole building 130 in a manner graphically and metaphorically similar to pulling a drawer out of a dresser drawer or other piece of furniture. The highlighted floor 120 can be separately displayed besides the entire graphically-displayed building 130, while retaining the vertical position of the highlighted floor 120 in the entire building 130. The original place 210 of the separated highlighted floor 120 can be visualized, to provide context, in the whole building 130. This enables given software module (e.g., module 7) to display more details of the highlighted floor 120 that is situated in the building 130.

Figure 3B:
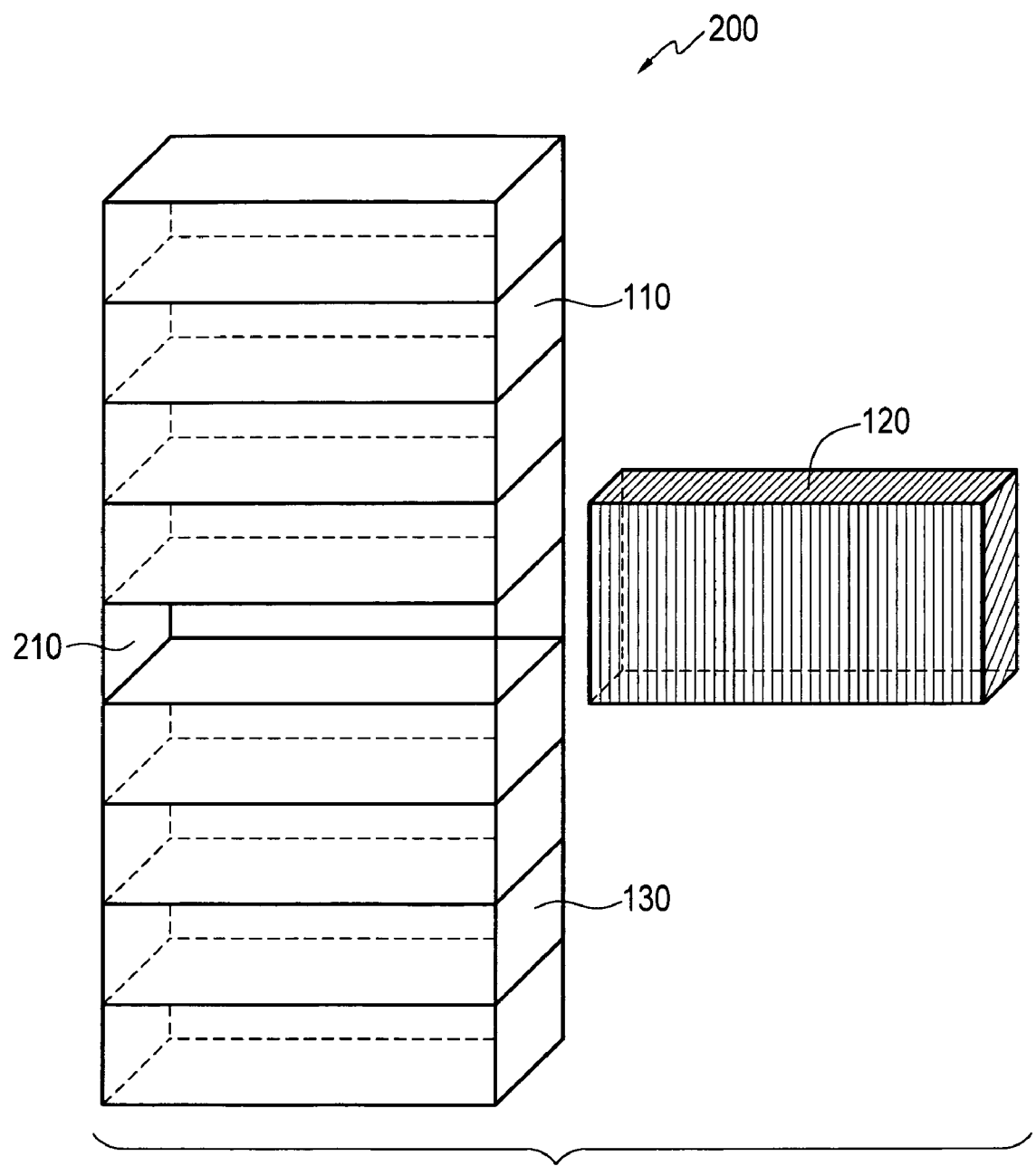
FIG. 3B illustrates a three-dimensional view of a multi-floor building model highlighting a graphical metaphor "drawers" with a highlighted floor enlarged and separately displayed beside a graphically-displayed building wherein the building can manually or automatically be pitched towards the viewer, in accordance with an alternative embodiment.

Referring to FIG. 3B a three-dimensional view of a graphically-displayed multi-floor building model 100 highlighting the graphical metaphor "Drawers" 200 with the highlighted floor 120 is enlarged and separately displayed besides the whole building 130 is illustrated, in accordance with an alternative embodiment. The highlighted floor 120 can be rotated as illustrated by an arrow 515 in FIG. 3A in order to move it to a new place so that the highlighted floor 120 can be displayed directly and more clearly. The highlighted floor 120 which is pulled out of the building 130 can also be enlarged to display more details. The highlighted floor 120 support semi-transparent rendering. The building 130 can be pitched automatically or manually toward the viewer.

Figure 4A:
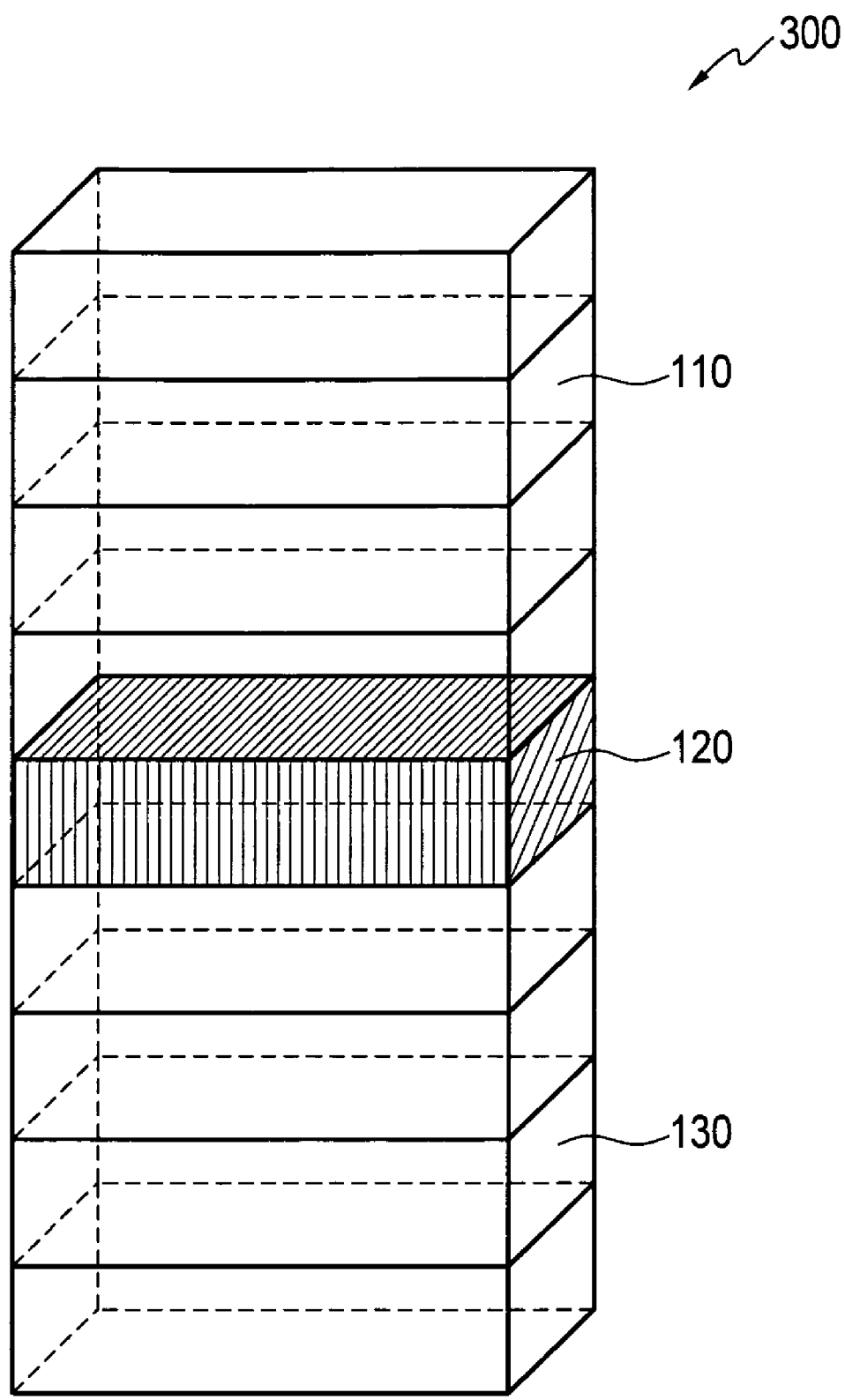
FIG. 4A illustrates a three-dimensional view of a multi-floor graphically-displayed building model highlighting a graphical metaphor "wireframe" with the effect of fading unselected floors, in accordance with an alternative embodiment.

Referring to FIG. 4A a three-dimensional view of a graphically-displayed multi-floor building model 100 highlighting the graphical metaphor "Wireframe" 300 with the effect of fading unselected floors 110 is illustrated, in accordance with an alternative embodiment. The highlighted floor 120 can be extruded and the unselected floors 110 of the building 130 can be faded. The effect of the unselected floors 110 can be faded by decreasing its visibility using transparent (i.e., only wire frame 310 is left) or semi-transparent (i.e., half visible floors are left) or hiding the unselected floors 110 (i.e., the rest of the unselected floors 110 will disappear). The unselected floors 110 can be disappeared but the frame 310 of the whole building 130 will still be kept with faded effect. This enables the display of more details about the highlighted floor 120. The highlighted floor 120 can be auto centered and enlarged to occupy the whole screen of a display unit (e.g., monitor 22 of FIG. 1) and hence more details of the selected floor 110 can be displayed.

Figure 4B:
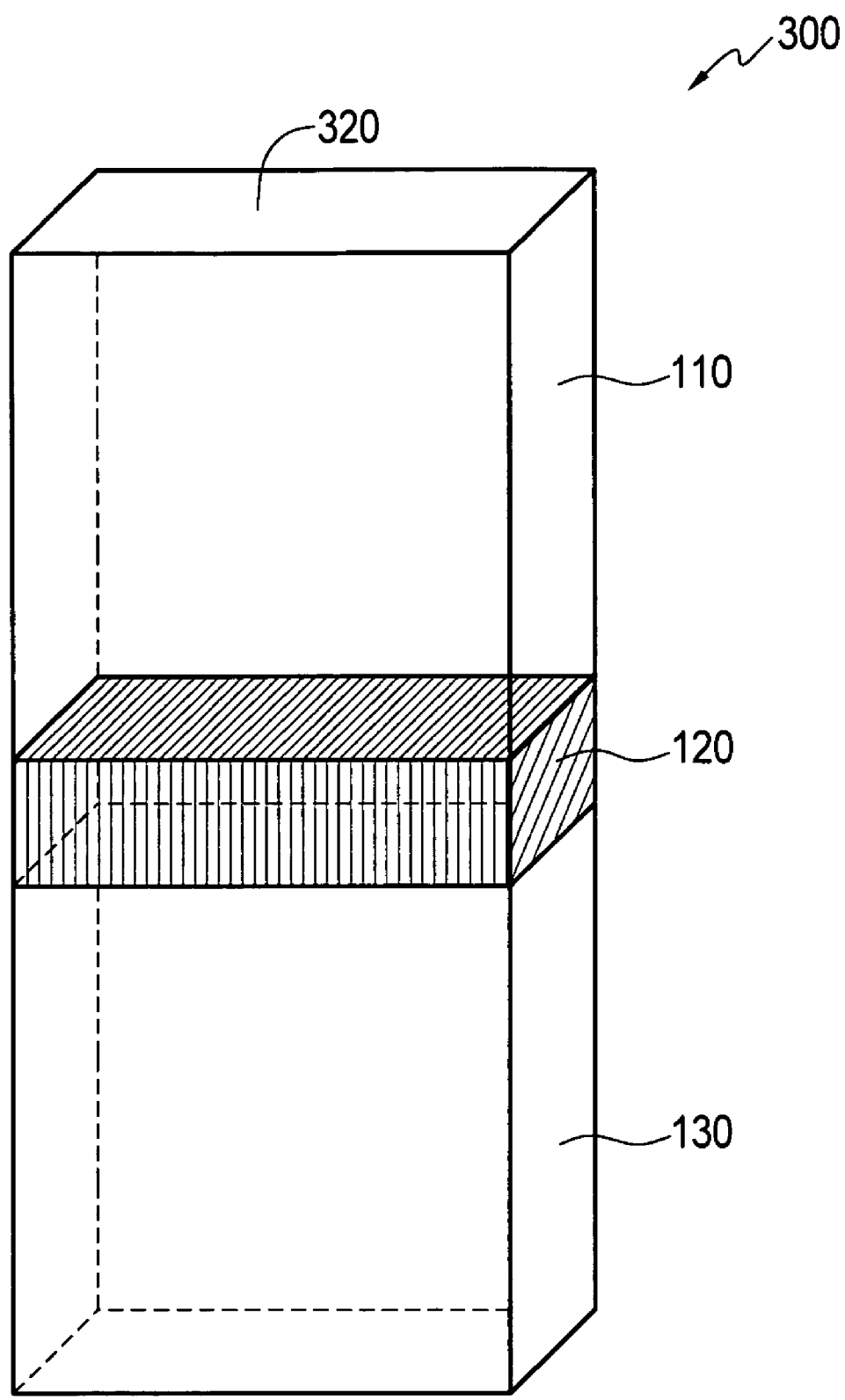
FIG. 4B illustrates a three-dimensional view of a graphically-displayed multi-floor building model highlighting a graphical metaphor "wireframe" with the effect of fading unselected floors by removing all details and wire frames, in accordance with an alternative embodiment.

Referring to FIG. 4B a three-dimensional view of a graphically-displayed multi-floor building model 100 highlighting the graphical metaphor "Wireframe" 300 with the effect of fading unselected floors 110 by removing all details and wire frames 310 is illustrated, in accordance with an alternative embodiment. The effect of the unselected floors 110 can be faded by removing all details and wire frames 310 of the floors and only the shadow frame 320 is left to provide context of whole building 130. The highlighted floor 120 can be shown with texture and the unselected floors 110 with fading shadow frame 320.

Figure 5:
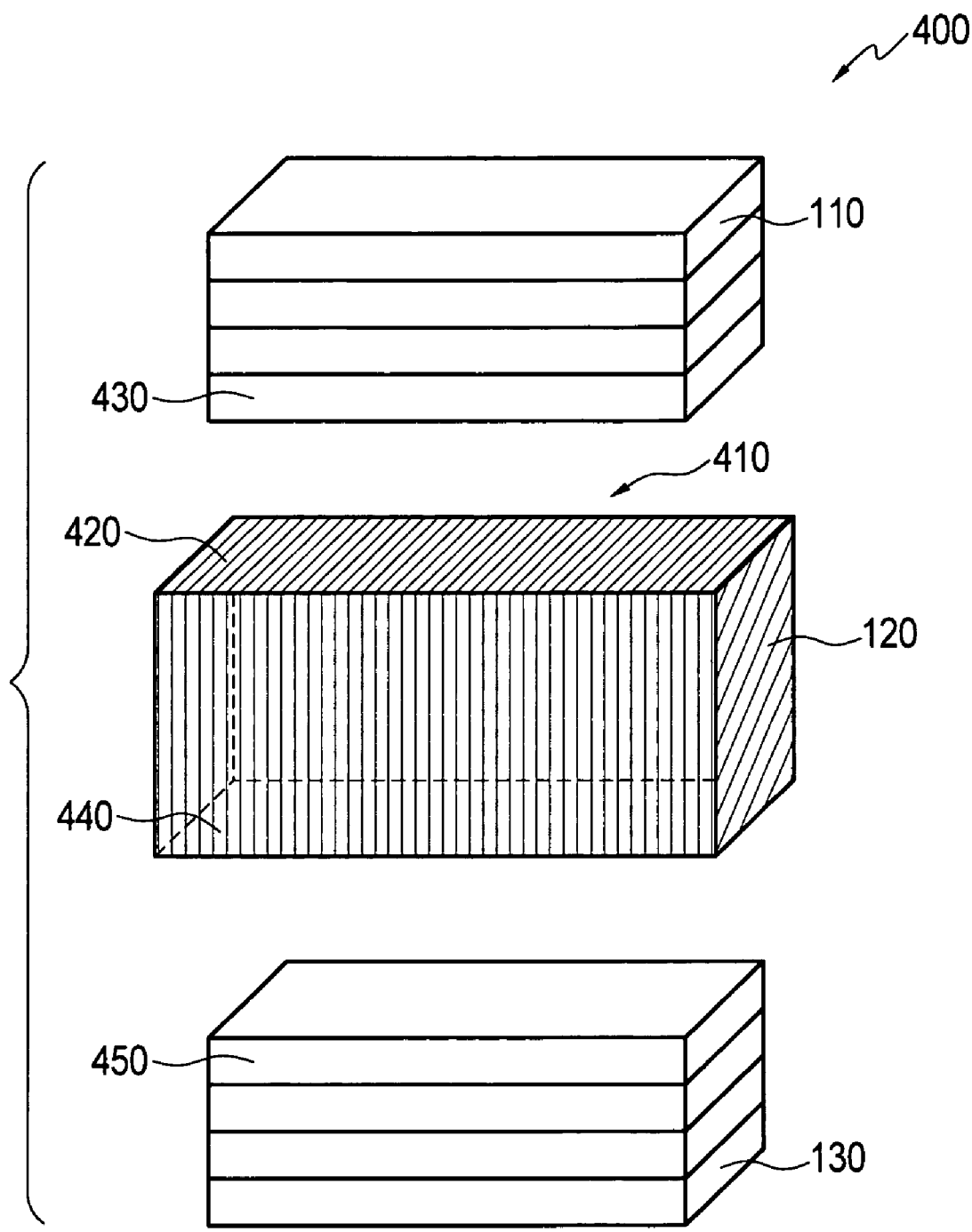
FIG. 5 illustrates a three-dimensional view of a graphically-displayed multi-floor building model highlighting a graphical metaphor "expansion-compression", with highlighted floors enlarged with more details and unselected floors compressed in accordance with an alternative embodiment.

Referring to FIG. 5 a three-dimensional view of a graphically-displayed multi-floor building model 100 highlighting the graphical metaphor "Expansion-compression" 400 with highlighted floor 120 enlarged with more details and unselected floors 110 compressed is illustrated, in accordance with an alternative embodiment. The highlighted floor 120 can be enlarged with more details and the unselected floors 110 can be compressed. Highlighted floor 120 and unselected floors 110 can be separated leaving a space interval 410 between highlighted floor 120 and unselected floor 110 of the building 130. The space interval 410 between highlighted floor 120 and unselected floor 110 can separate the ceiling 420 of the highlighted floor 120 from the up-floor 430 and separate ground 440 of the highlighted floor 120 from down-floor 450, thus avoid mixing the floors, elements and objects in visual. The building 130 can be pitched automatically or manually toward the viewer.

Figure 6:
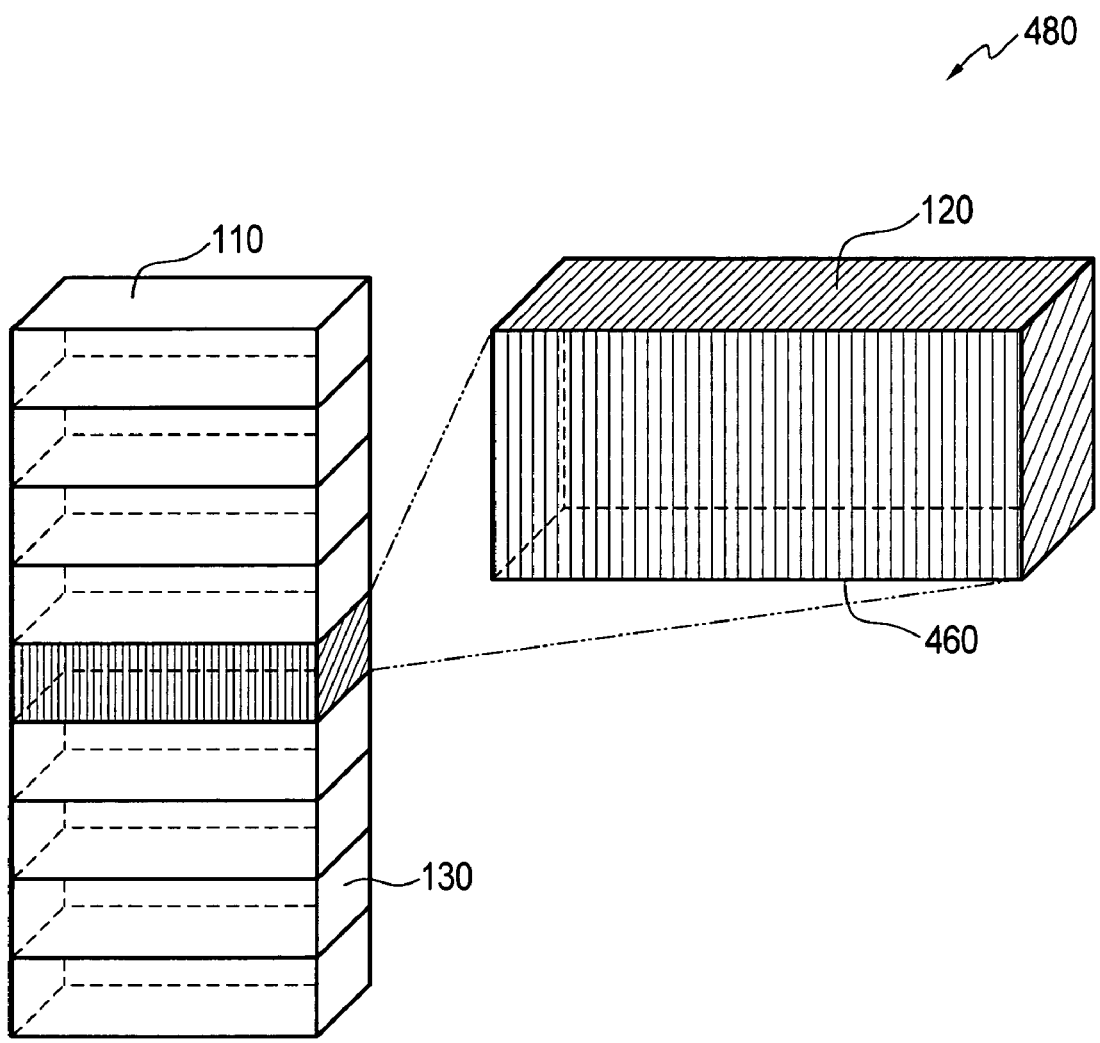
FIG. 6 illustrates a three-dimensional view of a graphically-displayed multi-floor building model highlighting the graphical metaphor "projected floor", with highlighted floor projected and enlarged in accordance with an alternative embodiment.

Referring to FIG. 6 a three-dimensional view of a graphically-displayed multi-floor building model 100 highlighting the graphical metaphor "projected floor" 480 with highlighted floor 120 projected and enlarged is illustrated, in accordance with an alternative embodiment. Highlighted floor 120 can be projected and enlarged in a separate position 460. The whole building 130 can be very small while the highlighted floor 120 can be large to display more details. The building 130 can be pitched automatically or manually toward the viewer.

Figure 7A:
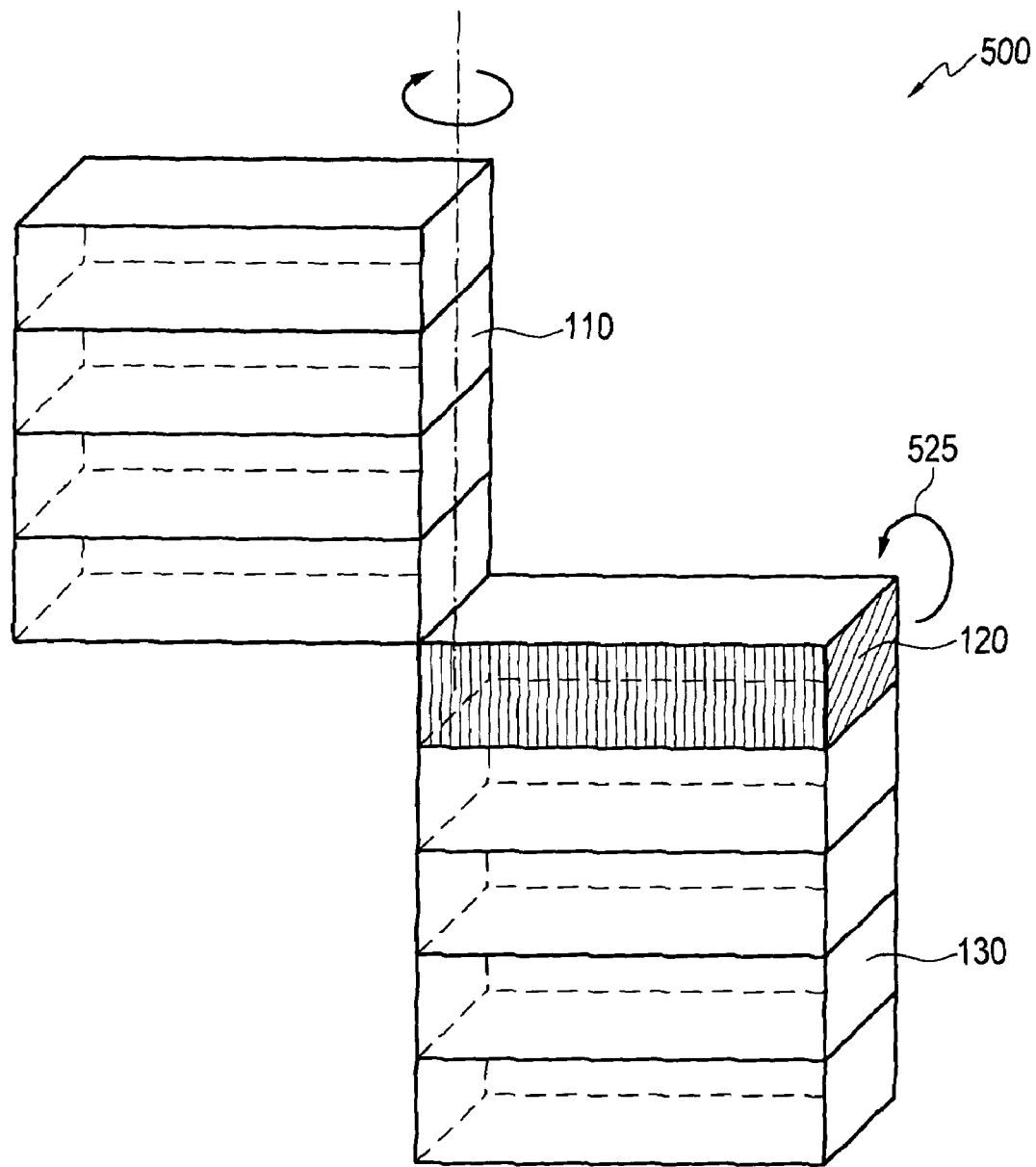
FIG. 7A illustrates a three-dimensional view of a graphically-displayed multi-floor building model highlighting the graphical metaphor "sliding unselected floors", with "up" unselected floors rotated at an angle in accordance with an alternative embodiment.

Referring to FIG. 7A a three-dimensional view of a graphically-displayed multi-floor building model 100 highlighting the graphical metaphor "sliding unselected floors" 500 with up unselected floors 110 rotated to a new angle is illustrated, in accordance with an alternative embodiment. The up unselected floors 110 can be rotated in order to move it to a new place and angle and separate it from the highlighted floor 120 so that the highlighted floor 120 can be displayed more clearly. This provides a sky view of the highlighted floor 120 to the end user.

Figure 7B:
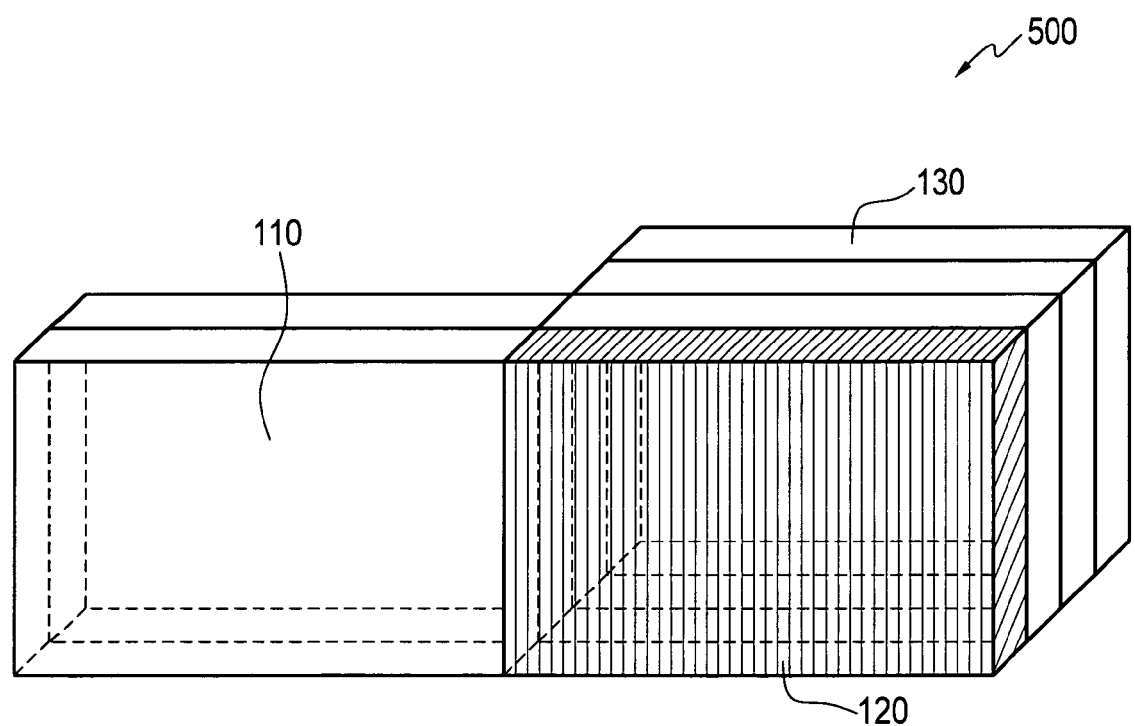
FIG. 7B illustrates a three-dimensional view of a graphically-displayed multi-floor building model highlighting a graphical metaphor "sliding unselected floors", with manually or automatically pitching the building towards the viewer, in accordance with an alternative embodiment.

Referring to FIG. 7B a three-dimensional view of a graphically-displayed multi-floor building model 100 highlighting the graphical metaphor "sliding unselected floors" 500 with manually or automatically pitch the building 130 towards the viewer is illustrated, in accordance with an alternative embodiment. Pitch the building 130 towards the viewer so that the highlighted floor 120 can be displayed more clearly. The highlighted floor 120 can be rotated as illustrated by an arrow 525 in FIG. 7A in order to move it to a new place so that the highlighted floor 120 can be displayed directly and more clearly. The building 130 can be pitched automatically or manually toward the viewer. The pitch range can be from 0 to 90 degrees depending on the application needs.

Figure 8A:
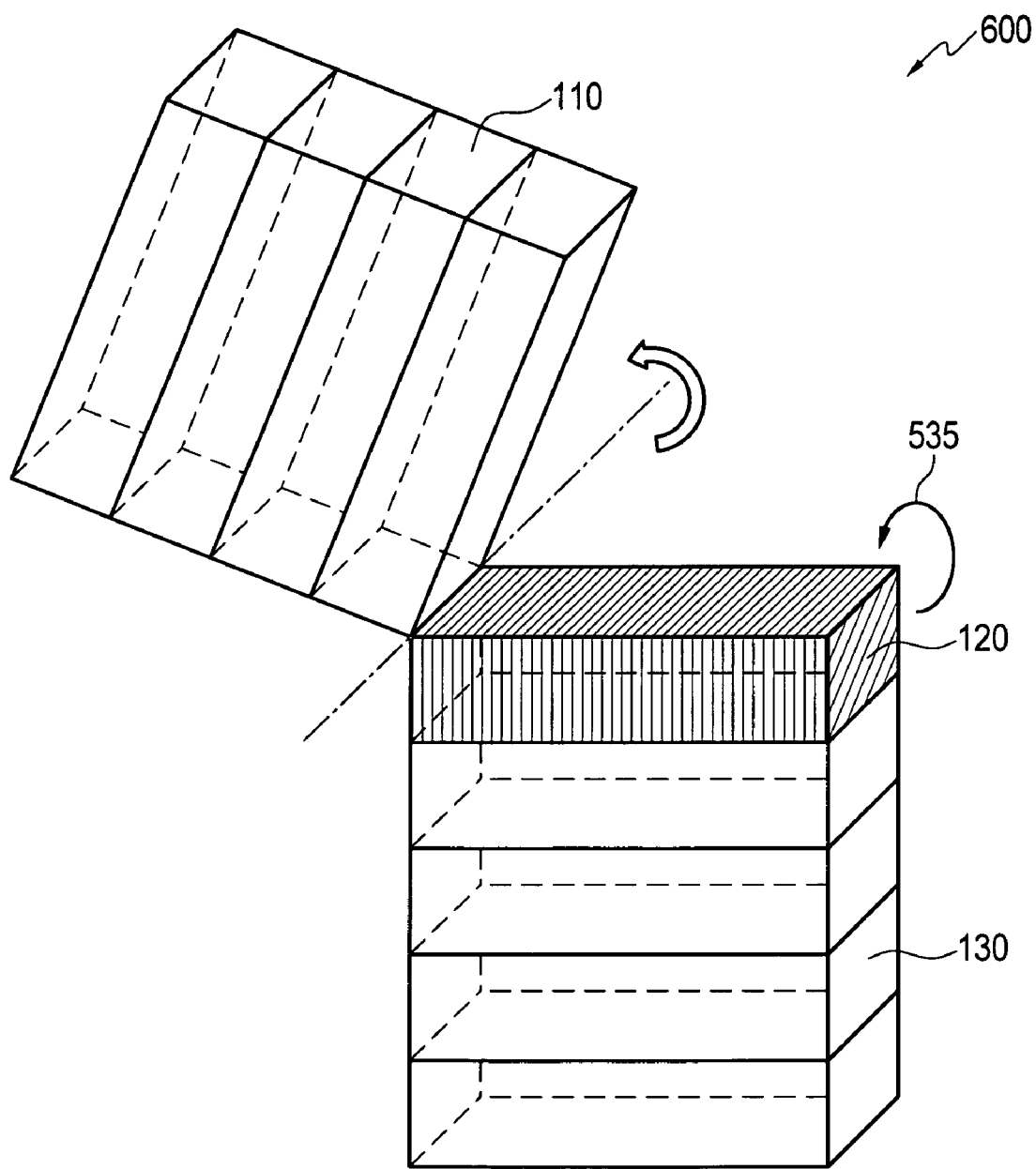
FIG. 8A illustrates a three-dimensional view of a graphically-displayed multi-floor building model highlighting a graphical metaphor of "turning the pages", with "up" unselected floors turned, in accordance with an alternative embodiment.

Referring to FIG. 8A a three-dimensional view of a graphically-displayed multi-floor building model 100 highlighting the graphical metaphor "turning the pages" 600 with up unselected floors 110 turned is illustrated, in accordance with an alternative embodiment. The process of "turn over the up" unselected floors 110 is similar to turning over the pages of a book so that the highlighted floor 120 can be displayed with greater and enhanced details. This feature provides to the end use, a "sky view" of the highlighted floor 120.

Figure 8B:
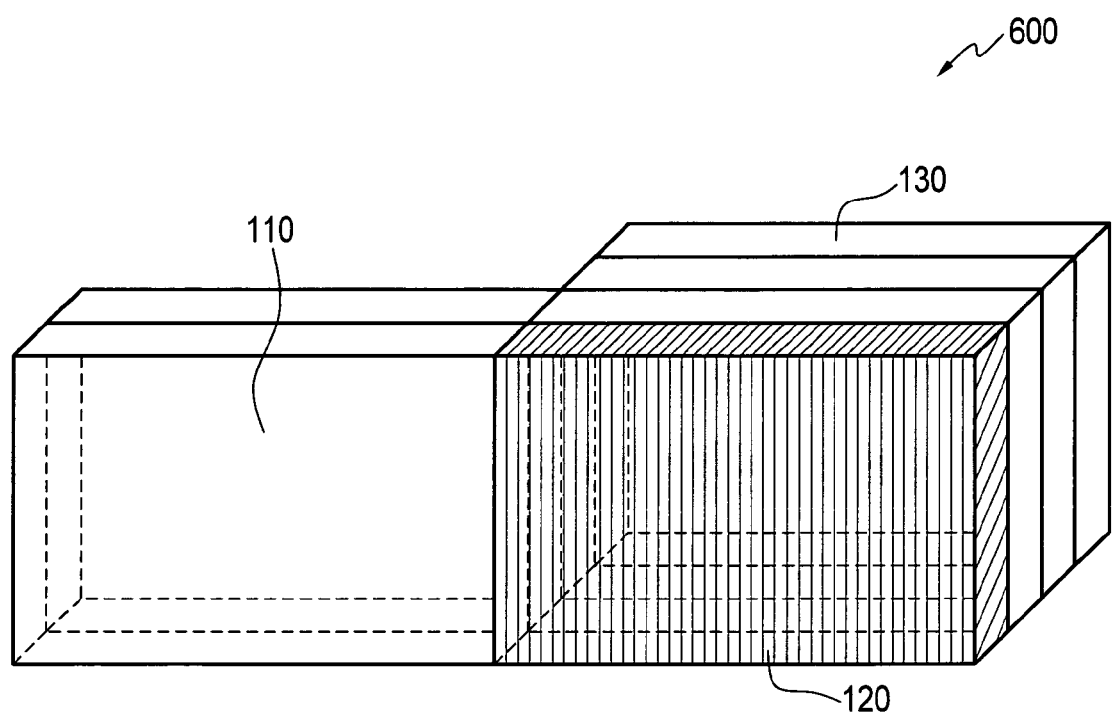
FIG. 8B illustrates a three-dimensional view of a multi-floor building model highlighting a graphical metaphor of "turning the pages", with manually or automatically pitching the building towards the viewer, in accordance with an alternative embodiment.

Referring to FIG. 8B a three-dimensional view of a graphically-displayed multi-floor building model 100 highlighting a graphical metaphor of "turning the pages" 600 by manually pitching the building 130 towards the viewer is illustrated, in accordance with an alternative embodiment. The highlighted floor 120 can be rotated, as illustrated by an arrow 535 in FIG. 8A, in order to move the feature to a new position so that the highlighted floor 120 can be displayed directly and more clearly. The building 130 can also be pitched towards the viewer so that the highlighted floor 120 is displayed with greater clarity. The building 130 can be graphically pitched automatically or manually toward the viewer as illustrated in FIG. 5B. The pitch range can be from 0 to 90 degrees depending on the application needs.

Figure 9:
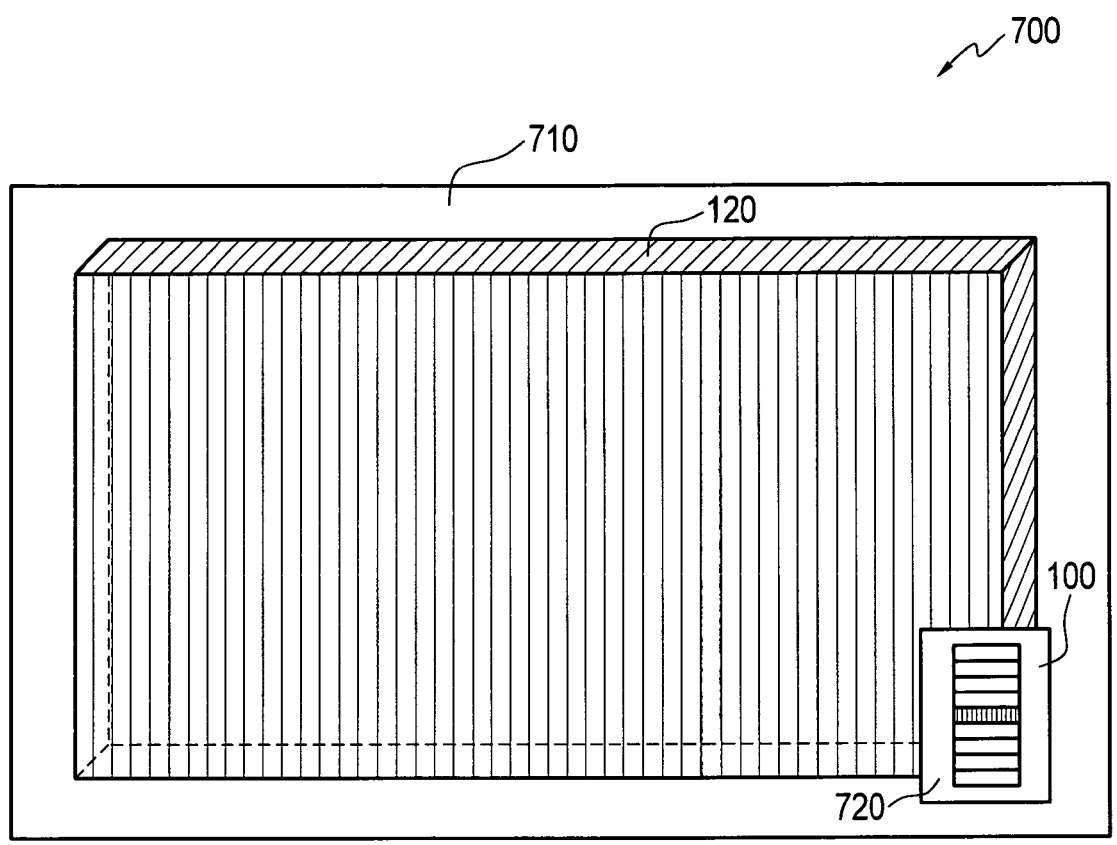
FIG. 9 illustrates a three-dimensional view of a graphically-displayed multi-floor building model highlighting a graphical metaphor of a "big map-small map", with highlighted floor enlarged and displayed in the whole screen in accordance with an alternative embodiment.

Referring to FIG. 9, a three-dimensional view of a graphically-displayed multi-floor building model 100 highlighting the graphical metaphor of a "Big map-small map" 700 with a highlighted floor 120 enlarged and displayed in the whole screen 710 is illustrated, in accordance with an alternative embodiment. The highlighted floor 120 can be graphically enlarged and displayed in the whole screen 710 while a small window 720 can be provided, which indicates an overview of the building model 100 with respect to the highlighted floor 120. The window 720 can be displayed on the bottom left to provide a context for the multi-floor building model 100.

Figure 10A:
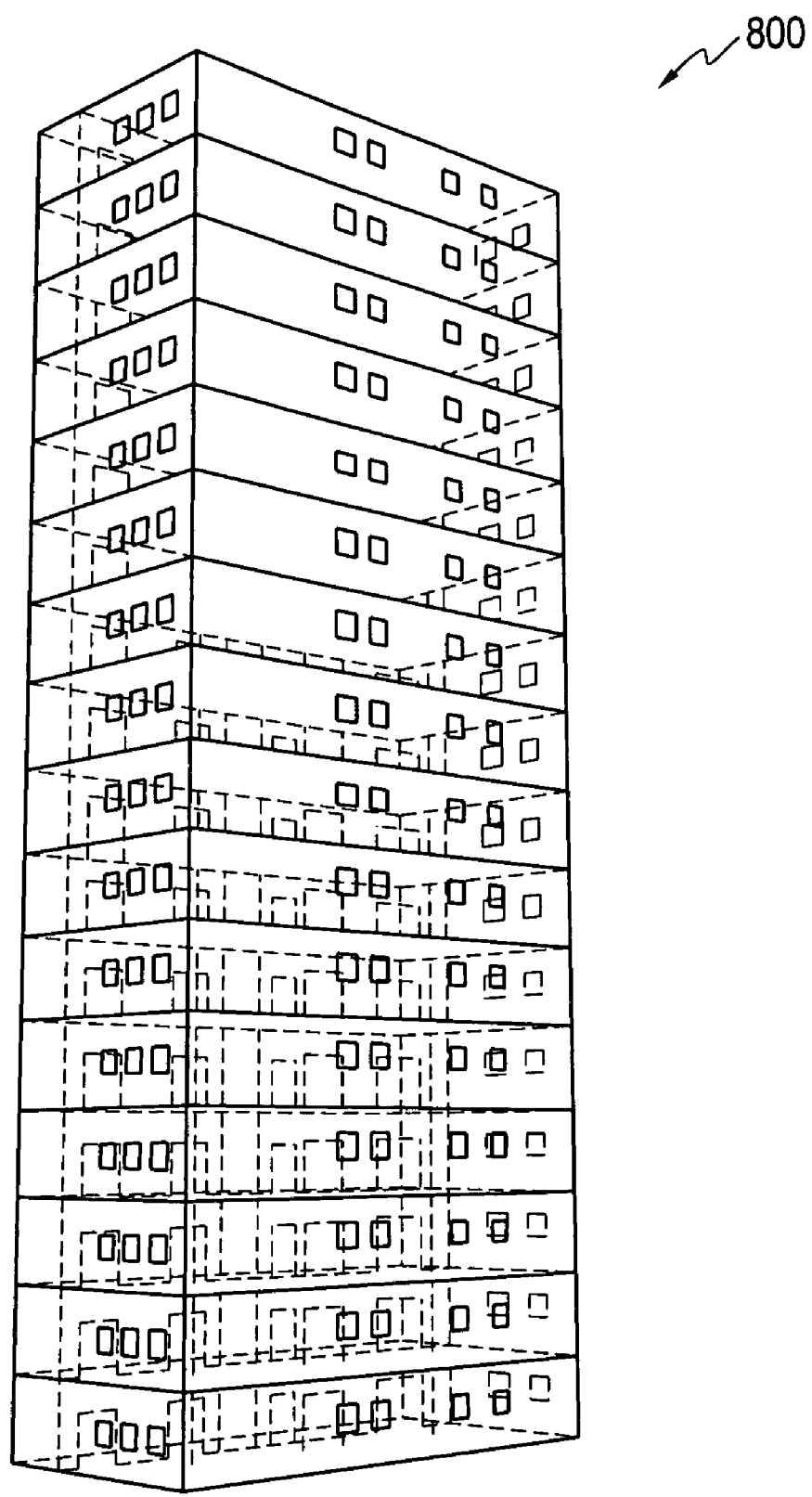
FIG. 10A illustrates a three-dimensional view of a graphically-displayed multi-floor building model highlighting a graphical metaphor of a "fisheye", with transparent view of the whole building in accordance with an alternative embodiment.

Referring to FIG. 10A, a three-dimensional view of a graphically-displayed multi-floor building model 100 highlighting a graphical metaphor "fisheye" 800 with transparent view of the whole building in accordance with an alternative embodiment. The building 130 can be graphically pitched automatically or manually toward the viewer.

Figure 10B:
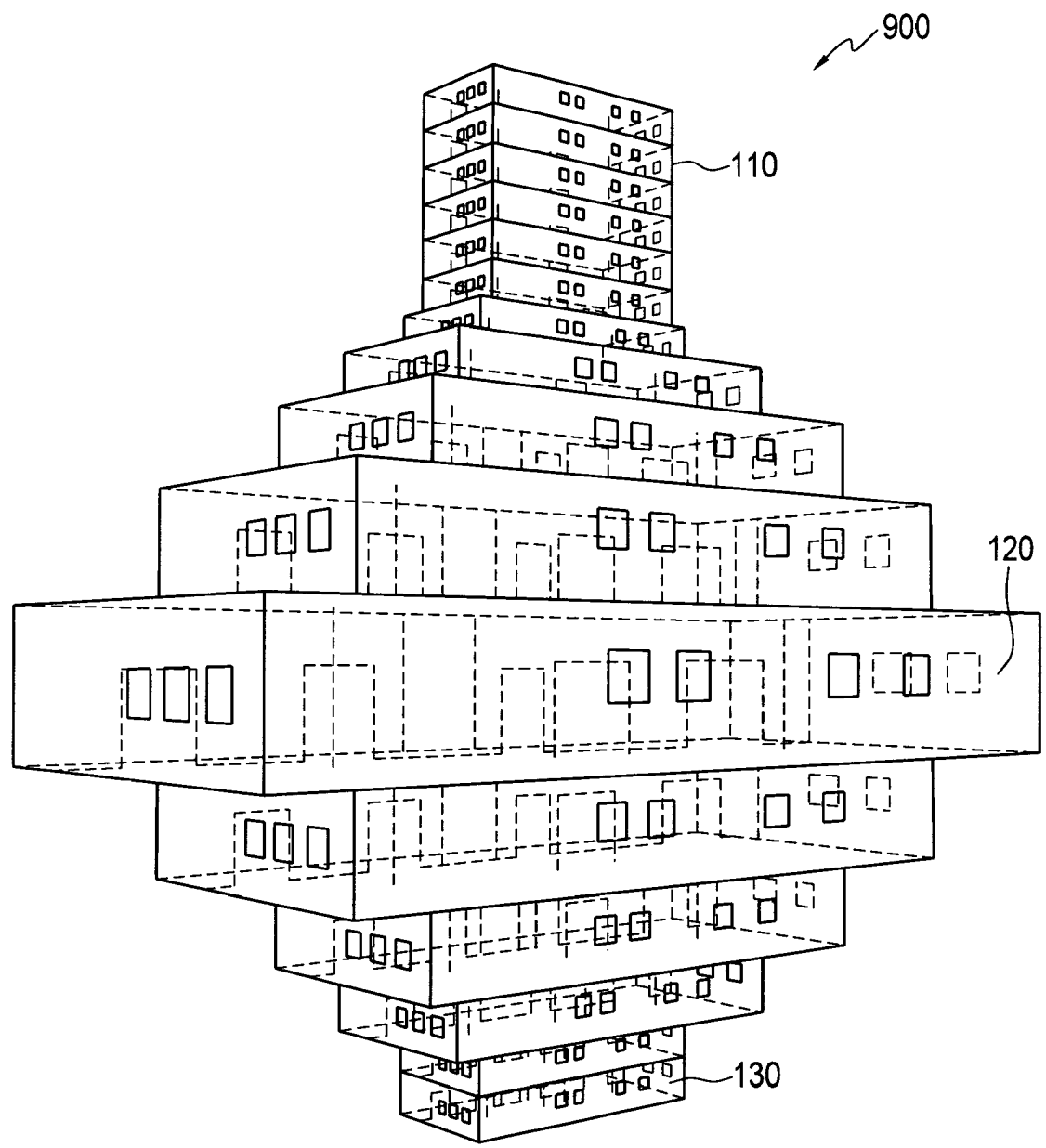
FIG. 10B illustrates a three-dimensional view of a graphically-displayed multi-floor building model highlighting a graphical metaphor of a "fisheye", with highlighted floor enlarged and shrink other floors with distorted display in accordance with an alternative embodiment.

Referring to FIG. 10B, a three-dimensional view of a graphically-displayed multi-floor building model 100 highlighting a graphical metaphor of a "fisheye" 900 with highlighted floor 120 enlarged and shrink unselected floors 110 with a distorted display is illustrated, in accordance with an alternative embodiment. The building 130 can be graphically pitched automatically or manually toward the viewer.

Figure 11:
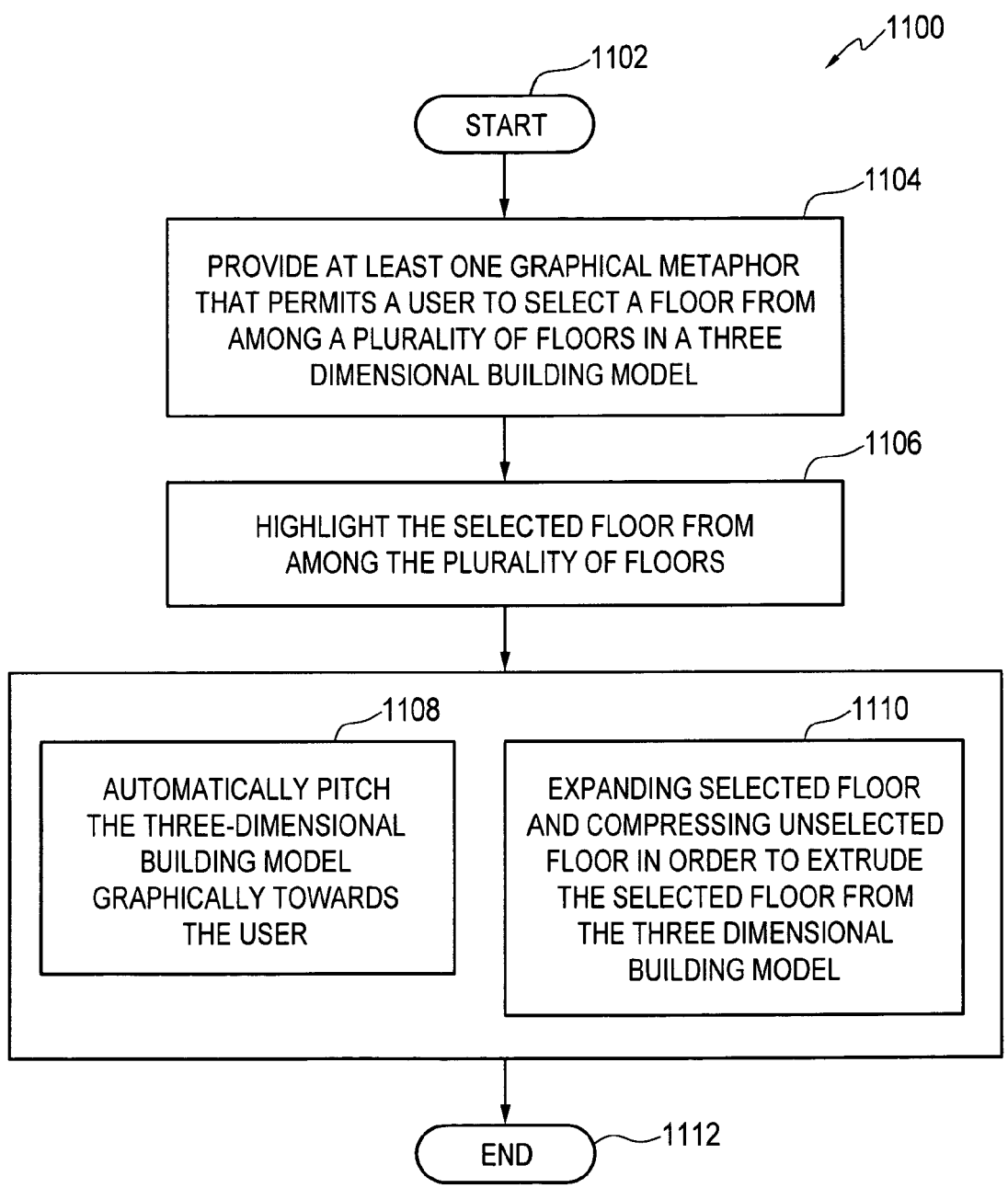
FIG. 11 illustrated a flow chart of operations depicting logical operation steps for displaying selected floors with sufficient details in the context of a three-dimensional graphically displayed building model in accordance with a preferred embodiment.

Referring to FIG. 11, a high-level flow chart of operations depicting logical operational steps of a method 1100 for displaying a selected floor with sufficient details in the context of a three-dimensional building model is depicted, in accordance with a preferred embodiment. The process depicted in FIG. 11 can be initiated, as indicated at block 1102. Thereafter, as illustrated at block 1104, one or more graphical metaphors can be provided, which permit a user to graphically select a floor from among a plurality of floors of the three-dimensional building model 100 as described earlier. The selected floor 120 can be highlighted from among a plurality of floors, as shown at block 1106. Next, as depicted at block 1108, the three-dimensional building model 100 can be graphically pitched automatically or manually towards the viewer. Thereafter, as indicated at block 1110, the selected floor 120 can be expanded and the unselected floors 110 are then generally compressed in order to extrude the selected floor 120 from the three-dimensional building model 100. The process can then terminate, as indicated at block 1112.

Note that variations may be implemented with respect to the above-referenced methods. For example, in accordance with an alternative embodiment, it may not be necessary to include the operations described above with respect to blocks 1108 or 1110. Additionally, the process sequence between the operations described at blocks 1108 and 1110 may be interchangeable, depending upon design considerations and implementations for alternative embodiments. It can also be appreciated that the various views illustrated herein with respect to FIGS. 2-11 can be graphically displayed for a user via a display device, such as, for example, monitor 22 depicted in FIG. 1.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for distinctively displaying building features with sufficient details in a three-dimensional building model, comprising:
providing at least one graphical metaphor that permits a user to select with enhanced granularity at least one building floor from among a plurality of building floors associated with a three-dimensional model of a building, wherein said plurality of building floors include a plurality of building features including building windows, building ceilings, detectors, and objects within said building, by executing a program instruction in a data-processing apparatus;
graphically selecting said at least one building floor from among said plurality of building floors utilizing said at least one graphical metaphor, in response to a particular input by said user, thereby allowing said user an ability to clearly identify, graphically manipulate and distinguish selected building floors and features among said plurality of building floors and correctly visualize said at least one building floor with respect to said three-dimensional model of said building, by executing a program instruction in said data-processing apparatus;
utilizing said at least one graphical metaphor to distinguish said at least one building floor from among said plurality of building floors by:
highlighting said at least one building floor from said plurality of building floors to derive at least one highlighted building floor, by executing a program instruction in a data-processing apparatus;
manually pitching said at least one building floor graphically towards said user while a plurality of unselected building floors remain stationary, by executing a program instruction in a data-processing apparatus; and
expanding said at least one highlighted building floor and compressing said plurality of unselected building floors in order to extrude said at least one highlighted building floor from said three-dimensional model of said building, by executing a program instruction in a data processing apparatus.

2. The method of claim 1 further comprising simulating said at least one highlighted building floor, by executing an animation program instruction in a data-processing apparatus.

3. The method of claim 1 further comprising:
providing said at least one graphical metaphor as a graphically displayed "drawer" by sliding out said at least one building floor from among said plurality of building floors and separately displaying said at least one building floor, by executing a program instruction in said data-processing apparatus;
rotating said building floor and moving said building floor to a new place according to said graphical metaphor, by executing a program instruction in said data-processing apparatus; and
displaying a visualization of the original location of said at least one building floor beside the entire graphically-displayed building in order to provide a context of said at least one building floor with respect to said three-dimensional building model of said building, by executing a program instruction in said data-processing apparatus.

4. The method of claim 3 further comprising configuring said at least one graphical metaphor as a graphically displayed "drawer" that supports a semi-transparent rendering of said drawer, by executing a program instruction in said data-processing apparatus.

5. The method of claim 1 further comprising:
providing said at least one graphical metaphor as a graphically displayed "wireframe";
extruding said at least one building floor and implementing a graphically-displayed fading effect with respect to said plurality of building floors, and thereafter leaving a shadow frame of said plurality of building floors in order to provide a context of said three-dimensional model of said building for said user, by executing a program instruction in said data-processing apparatus.

6. The method of claim 1 further comprising:
providing said at least one graphical metaphor as a graphically displayed "expansion-compression" enlarging said at least one highlighted building floor and compressing unselected remaining plurality of building floors and;
leaving a space interval for graphically separating a ceiling and a roof of said at least one building floor from said plurality of building floors.

7. The method of claim 1 further comprising:
providing said at least one graphical metaphor as a graphically displayed "projected floor" that graphically separates, projects and enlarges said at least one highlighted building floor and graphically compresses said three-dimensional model of said building, by executing a program instruction in said data-processing apparatus.

8. The method of claim 1 further comprising;
providing said at least one graphical metaphor as a graphically displayed feature of "sliding unselected floors" wherein a user independently graphically rotates a plurality of unselected building floors located above said at least one building floor to a new position and a new angle, by executing a program instruction in said data-processing apparatus.

9. The method of claim 1 further comprising:
providing said at least one graphical metaphor as a graphically displayed feature of "turning the pages" that permits a user to graphically turn over an unselected plurality of building floors located above said at least one building floor to a new position and a new angle while unselected building floors below remains stationary, by executing a program instruction in a data-processing apparatus.

10. The method of claim 1 further comprising:
providing said at least one graphical metaphor as a graphically displayed "big map-small map" that permits a user to graphically enlarge and display said at least one building floor in a whole screen of a display, by executing a program instruction in a data-processing apparatus; and
displaying an overview of said three-dimensional model of said building within a small window of said whole screen of a display in order to graphically illustrate a location of said at least one building floor within said building, by executing a program instruction in a data-processing apparatus.

11. The method of claim 1 further comprising:
providing said at least one graphical metaphor as a graphically displayed "fisheye" feature that permits a user to graphically enlarge said at least one building floor and shrink said plurality of building floors with a distorted display thereof, by executing a program instruction in a data-processing apparatus.

12. A computer-implemented system for distinctively displaying building features with sufficient details in a three-dimensional building model, comprising:
- a data-processing apparatus;
- a module executed by said data-processing apparatus, said module and said data-processing apparatus being operable in combination with one another to:
- provide at least one graphical metaphor that permits a user to select with an enhanced granularity at least one building floor from among a plurality of building floors associated with a three-dimensional model of a building, wherein said plurality of building floors include a plurality of building features including building windows, building ceilings, detectors, and objects within said building;
- graphically select said at least one building floor from among said plurality of building floors utilizing said at least one graphical metaphor, in response to a particular input by said user, thereby allowing said user an ability to clearly identify, graphically manipulate and distinguish selected building floors and features among said plurality of building floors and correctly visualize said at least one building floor with respect to said three-dimensional model of said building, by executing a program instruction in said data-processing apparatus;
- utilize said at least one graphical metaphor to distinguish said at least one building floor from among said plurality of building floors by:
- highlighting said at least one building floor from said plurality of building floors to derive at least one highlighted building floor, by executing a program instruction in a data-processing apparatus;
- manually pitching said at least one building floor graphically towards said user while a plurality of unselected building floors remain stationary, by executing a program instruction in a data-processing apparatus; and
- expanding said at least one highlighted building floor and compressing said plurality of unselected building floors in order to extrude said at least one highlighted building floor from said three-dimensional model of said building, by executing a program instruction in a data processing apparatus.

13. The system of claim 12 wherein said module and said data-processing apparatus are further operable in combination with one another to:
- provide said at least one graphical metaphor as a graphically displayed "drawer" in order to slide out said at least one building floor from among said plurality of building floors and separately display said at least one building floor;
- provide an option to rotate said building floor and move said building floor to a new place;
- display a visualization of the original location of said at least one building floor in order to provide a context of said at least one building floor with respect to said three-dimensional building model of said building.

14. The system of claim 13 wherein said module and said data-processing apparatus are further operable in combination with one another to:
- permit said at least one graphical metaphor of said graphically displayed "drawer" to support a semi-transparent rendering thereof;
- provide said at least one graphical metaphor as a graphically displayed "wireframe" that is utilized by said user to extrude said at least one building floor and implement a graphically-displayed fading effect with respect to a plurality of unselected building floors, and thereafter leaves a shadow frame of said plurality of unselected building floors in order to provide a context of said three-dimensional model of said building for said user;
- provide said at least one graphical metaphor as a graphically displayed "expansion-compression" in order to enlarge said at least one building floor and compresses said plurality of unselected building floors to leave a space interval for graphically separating a ceiling and a roof of said at least one building floor from said plurality of unselected building floors;
- provide said at least one graphical metaphor as a graphically displayed "projected floor" that graphically projects and enlarges said at least one building floor and thereafter graphically compresses said three-dimensional model of said building;
- provide said at least one graphical metaphor as a graphically displayed feature of "sliding unselected floors" that permits a user to graphically rotate said plurality of unselected building floors located above said at least one building floor to a new position and a new angle;
- provide said at least one graphical metaphor as a graphically displayed feature of "turning the pages" that permits a user to graphically turn over said plurality of unselected building floors located above said at least one building floor to a new position and a new angle;
- provide said at least one graphical metaphor as a graphically displayed "big map-small map" that permits a user to graphically enlarge and display said at least one building floor in a whole screen of a display; and
- display an overview of said three-dimensional model of said building within a small window of said display in order to graphically illustrate a location of said at least one building floor within said building; and
- provide said at least one graphical metaphor as a graphically displayed "fisheye" feature that permits a user to graphically enlarge said at least one building floor and shrink said plurality of building floors with a distorted display thereof.

15. A program product residing in a computer for distinctively displaying building features with sufficient details in a three-dimensional building model, comprising:
- non-transitory machine-implemented instruction media residing in a computer for providing at least one graphical metaphor that permits a user to select with an enhanced granularity at least one building floor from among a plurality of building floors associated with a three-dimensional model of a building;
- non-transitory machine-implemented instruction media residing in a computer for graphically selecting said at least one building floor from among said plurality of building floors utilizing said at least one graphical metaphor, in response to a particular input by said user, thereby allowing said user an ability to clearly identify, graphically manipulate and distinguish building floors among said plurality of building floors and correctly visualize said at least one building floor with respect to said three-dimensional models of said building; wherein said building floors include a plurality of building features including building windows, building ceilings, detectors, and objects within said building;
- non-transitory machine-implemented instruction media residing in a computer, which permits said at least one graphical metaphor to be utilized to distinguish said at least one building floor from among said plurality of building floors by:

highlighting said at least one building floor from said plurality of building floors to derive at least one highlighted building floor, by executing a program instruction in a data-processing apparatus;

manually pitching said at least one building floor graphically towards said user while a plurality of unselected building floors remain stationary, by executing a program instruction in a data-processing apparatus; and expanding said at least one highlighted building floor and compressing said plurality of unselected building floors in order to extrude said at least one highlighted building floor from said three-dimensional model of said building, by executing a program instruction in a data processing apparatus.

16. The program product of claim 15 further comprising:

non-transitory machine-implemented instruction media residing in a computer to provide said at least one graphical metaphor as a graphically displayed "drawer" in order to slide out said at least one building floor from among said plurality of building floors and separately display said at least one building floor;

non-transitory machine-implemented instruction media residing in a computer to provide an option to rotate said building floor and move said building floor to a new place, by executing a program instruction in said data-processing apparatus;

non-transitory machine-implemented instruction media residing in a computer to display a visualization of the original location of said at least one building floor in order to provide a context of said at least one building floor with respect to said three-dimensional building model of said building.

17. The program product of claim 16 further comprising:

non-transitory machine-implemented instruction media residing in a computer to permit said at least one graphical metaphor of said graphically displayed "drawer" to support a semi-transparent rendering thereof;

non-transitory machine-implemented instruction media residing in a computer to provide said at least one graphical metaphor as a graphically displayed "wireframe" that is utilized by said user to extrude said at least one building floor and implement a graphically-displayed fading effect with respect to a plurality of unselected building floors, and thereafter leaves a shadow frame of said plurality of unselected building features in order to provide a context of said three-dimensional model of said building for said user;

non-transitory machine-implemented instruction media residing in a computer to provide said at least one graphical metaphor as a graphically displayed "expansion-compression" in order to enlarge said at least one building floor and compresses said plurality of unselected building floors to leave a space interval for graphically separating a ceiling and a roof of said at least one building floor from said plurality of unselected building floors;

non-transitory machine-implemented instruction media residing in a computer to provide said at least one graphical metaphor as a graphically displayed "projected floor" that graphically projects and enlarges said at least one building floor and thereafter graphically compresses said three-dimensional model of said building;

non-transitory machine-implemented instruction media residing in a computer to provide said at least one graphical metaphor as a graphically displayed feature of "sliding unselected floors" that permits a user to graphically rotate a plurality of unselected building floors located above said at least one building floor to a new position and a new angle;

non-transitory machine-implemented instruction media residing in a computer to provide said at least one graphical metaphor as a graphically displayed feature of "turning the pages" that permits a user to graphically turn over a plurality of unselected building floors located above said at least one building floor to a new position and a new angle;

non-transitory machine-implemented instruction media residing in a computer to provide said at least one graphical metaphor as a graphically displayed "big map-small map" that permits a user to graphically enlarge and display said at least one building floor in a whole screen of a display;

non-transitory machine-implemented instruction media residing in a computer to display an overview of said three-dimensional model of said building within a small window of said display in order to graphically illustrate a location of said at least one building floor within said building; and non-transitory machine-implemented instruction media residing in a computer to provide said at least one graphical metaphor as a graphically displayed "fisheye" feature that permits a user to graphically enlarge said at least one building floor and shrink a plurality of unselected building floors with a distorted display thereof.

* * * * *